US010323548B2

(12) United States Patent
Andersson et al.

(10) Patent No.: US 10,323,548 B2
(45) Date of Patent: Jun. 18, 2019

(54) INTERNAL COMBUSTION ENGINE WASTE HEAT RECOVERY (WHR) DEVICE INCLUDING MULTIPLE COOLING SOURCES FOR A WHR CONDENSER

(71) Applicant: VOLVO TRUCK CORPORATION, S-405 08 Göteborg (SE)

(72) Inventors: Lennart Andersson, Varberg (SE); Arne Andersson, Mölnlycke (SE)

(73) Assignee: Volvo Truck Corporation, Göteborg (SE)

( * ) Notice: Subject to any disclaimer, the term of this patent is extended or adjusted under 35 U.S.C. 154(b) by 198 days.

(21) Appl. No.: 15/319,766

(22) PCT Filed: Jun. 26, 2014

(86) PCT No.: PCT/EP2014/001750
§ 371 (c)(1),
(2) Date: Dec. 17, 2016

(87) PCT Pub. No.: WO2015/197091
PCT Pub. Date: Dec. 30, 2015

(65) Prior Publication Data
US 2017/0152766 A1    Jun. 1, 2017

(51) Int. Cl.
*F01K 9/00* (2006.01)
*F01N 5/02* (2006.01)
(Continued)

(52) U.S. Cl.
CPC .......... *F01K 23/101* (2013.01); *F01K 9/003* (2013.01); *F01K 23/065* (2013.01); *F01N 5/02* (2013.01);
(Continued)

(58) Field of Classification Search
CPC .......... F01K 23/00; F01K 23/02; F01K 23/06; F01K 23/065; F01K 23/10–23/108;
(Continued)

(56) References Cited

U.S. PATENT DOCUMENTS 9,823,025 B2 * 11/2017 Mueller ................ F28D 9/0093
2010/0139626 A1 * 6/2010 Raab ........................ F01P 7/165
123/540
2012/0198840 A1 8/2012 Stegmaier et al.
(Continued)

FOREIGN PATENT DOCUMENTS

DE    102006043139 A1 *  3/2008 ............. F01N 5/025
EP    2554827 A1         2/2013
(Continued)

OTHER PUBLICATIONS

International Search Report (dated Oct. 2, 2014) for corresponding International App. PCT/EP2014/001750.
(Continued)

*Primary Examiner* — Laert Dounis
(74) *Attorney, Agent, or Firm* — WRB-IP LLP

(57) ABSTRACT

A device for recovery of waste heat generated during operation of an internal combustion engine includes a thermodynamic engine, which includes a working fluid circulation circuit and is configured for recovery of the waste heat a first arrangement for providing a first coolant from a first source for heat exchange with the working fluid in the working fluid circulation circuit, and at least one further arrangement for providing a further coolant from a further source for heat exchange with the working fluid in the working fluid circulation circuit, wherein the further source is at different heat level than the first source during operation of the internal combustion engine.

30 Claims, 7 Drawing Sheets

(51) Int. Cl.
*F01K 23/06* (2006.01)
*F01K 23/10* (2006.01)
*F02B 29/04* (2006.01)

(52) U.S. Cl.
CPC ...... *F02B 29/0462* (2013.01); *F02B 29/0475* (2013.01); *Y02T 10/146* (2013.01); *Y02T 10/16* (2013.01); *Y02T 10/166* (2013.01)

(58) Field of Classification Search
CPC ........ F01K 9/003; Y02T 10/16–10/166; F02G 5/00–5/04; F02B 29/0462
See application file for complete search history.

(56) References Cited

U.S. PATENT DOCUMENTS

| | | | | |
|---|---|---|---|---|
| 2013/0068202 A1* | 3/2013 | Kardos | ............... | F01P 3/20 123/563 |
| 2013/0118423 A1* | 5/2013 | Lutz | ............... | F01P 11/00 123/41.08 |
| 2014/0007575 A1 | 1/2014 | Ernst et al. | | |
| 2016/0053666 A1* | 2/2016 | Bruemmer | ............... | F01P 3/22 123/41.1 |
| 2016/0230641 A1* | 8/2016 | Honda | ............... | F02G 5/00 |
| 2017/0306806 A1* | 10/2017 | Kardos | ............... | F01K 23/065 |

FOREIGN PATENT DOCUMENTS

| | | | | |
|---|---|---|---|---|
| EP | 2789812 A1 | * | 10/2014 | ............ F01K 15/02 |
| JP | 2005282363 A | * | 10/2005 | |
| JP | 2013526682 A | | 6/2013 | |
| JP | 2014009617 A | | 1/2014 | |
| WO | 2012115572 A1 | | 8/2012 | |
| WO | 2012125107 A1 | | 9/2012 | |

OTHER PUBLICATIONS

Japanese Official Action (dated Apr. 18, 2018) for corresponding Japanese App. 2016-575177.

* cited by examiner

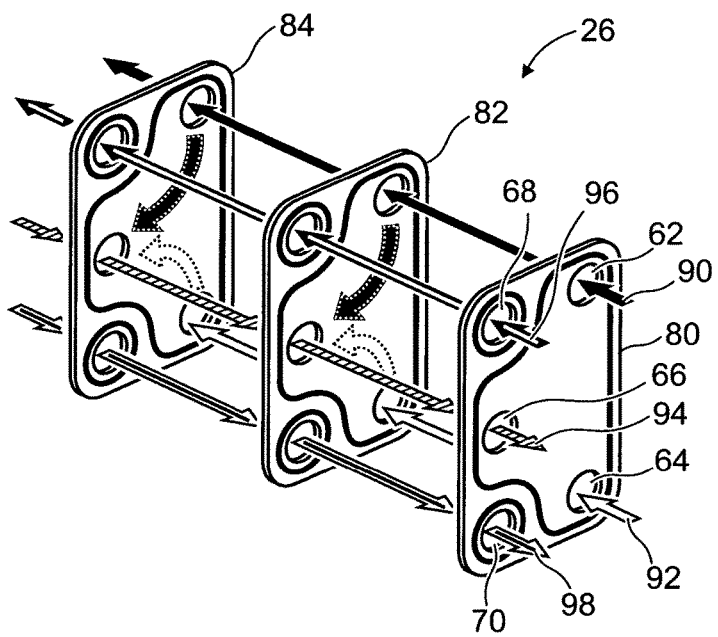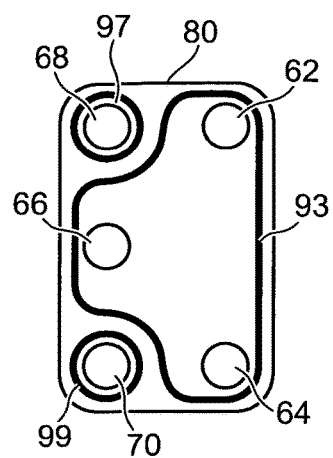
Fig.7a Fig.7b
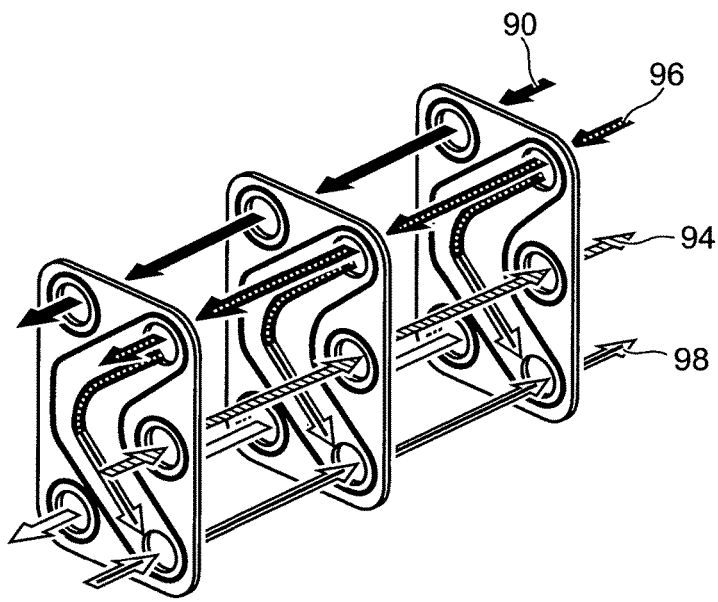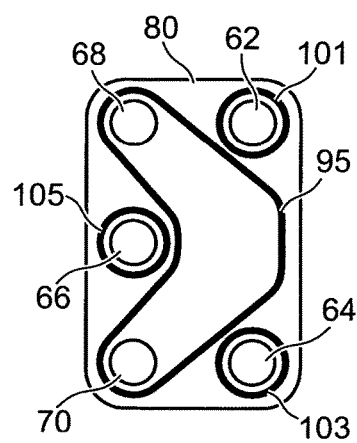
Fig.7c Fig.7d

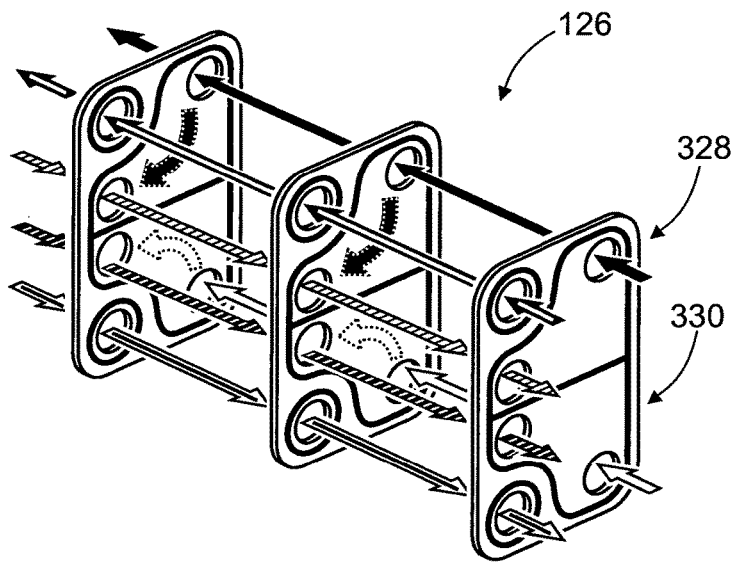 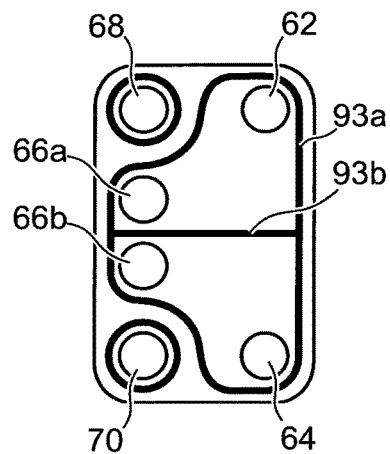
Fig.10a  Fig.10b
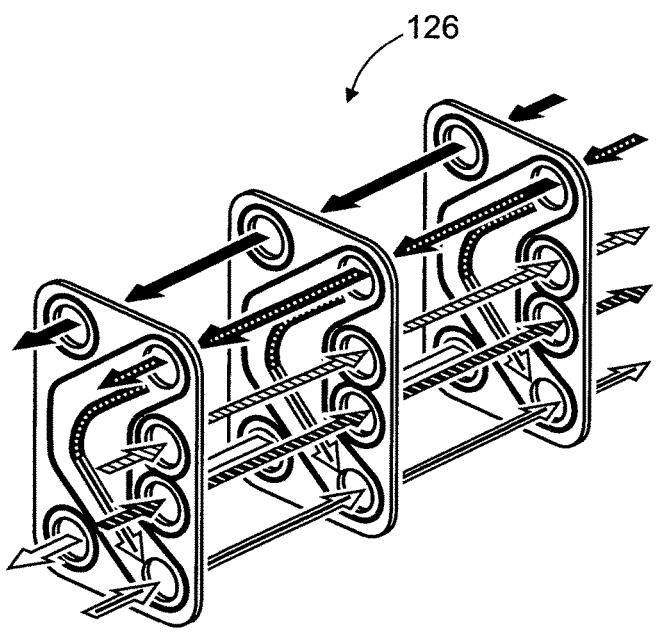 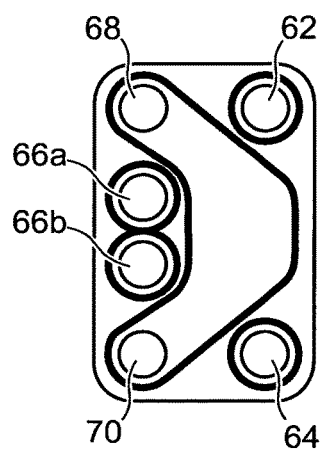
Fig.10c  Fig.10d

INTERNAL COMBUSTION ENGINE WASTE HEAT RECOVERY (WHR) DEVICE INCLUDING MULTIPLE COOLING SOURCES FOR A WHR CONDENSER

BACKGROUND AND SUMMARY

The invention relates to a device for recovery of waste heat generated during operation of an internal combustion engine and especially a diesel engine. The invention can be applied in vehicles and especially in heavy-duty vehicles such as trucks, buses and construction equipment (such as wheel loaders, excavators and articulated haulers). Although the invention will be described with respect to a truck, the invention is not restricted to this particular vehicle, but may also be used in other vehicles such as buses and construction equipment. The invention further relates to an engine system comprising the waste heat recovery device. The invention further relates to a vehicle comprising the engine system for recovery of waste heat of an internal combustion engine comprised in the vehicle. The invention further relates to a method for recovery of waste heat generated during operation of an internal combustion engine.

The waste heat recovery device comprises a thermodynamic engine configured for recovery of waste heat, especially from the exhaust gas stream. The thermodynamic engine comprises a working fluid circulation circuit. More specifically, the thermodynamic engine is configured for converting thermal energy of a gaseous phase working fluid into kinetic energy, and may be constituted by a Rankine cycle engine.

The working fluid of a waste heat recovery device based on a Rankine cycle usually cycles through four stages. In a first stage the liquid working fluid is pumped from low to high pressure. In the subsequent stage, the high pressure liquid working fluid is heated, e.g. by an external heat source, and thereby converted into its gaseous phase. In the next stage, the gaseous phase working fluid expands in an expander engine, for example a displacement expander, such as a piston engine, and/or a turbine. In its last stage, the working fluid is cooled down in a condenser and converted back to its liquid phase.

Usually, in a vehicle, the expander engine may either be connected to a generator for generating electric energy or to a drivetrain of a vehicle thereby acting as auxiliary power unit for the internal combustion engine.

In the condenser, the working fluid needs to be cooled below a condensing temperature of the working fluid. The cooling possibilities in a vehicle are however limited and in many applications already exhausted for cooling the internal combustion engine during high load ICE operation modes and in hot climates. Even if it seems possible to increase the fan size and/or the fan power, this also results in higher fuel consumption and/or a higher air resistance of the vehicle. Both of which should be avoided.

US 2012/0198840 discloses a device for recuperation of waste heat of an internal combustion engine, wherein a steam circuit is connected to a cooling circuit of the internal combustion engine for cooling of the working fluid in the steam circuit. More specifically, the cooling circuit of the ICE is branched off at the radiator outlet.

When there is a low or medium demand of power to the vehicle, the thermodynamic engine may be cooled from the radiator out utilising a low condensing temperature which gives a high Rankine efficiency. However, when there is a high demand of power to the vehicle and possibly also a high ambient temperature, the cooling efficiency of the vehicle is too low for using the radiator out for the thermodynamic engine, which may lead to a low Rankine efficiency.

It is desirable to provide a waste heat recovery device, which creates conditions for an improved recovery of waste heat, especially during high load ICE operation modes and in hot climates.

A waste heat recovery device according to an aspect of the invention comprises a first means for providing a first coolant from a first source for heat exchange with the working fluid in the working fluid circulation circuit, and at least one further means for providing a further coolant from a further source for heat exchange with the working fluid in the working fluid circulation circuit, wherein the further source is at different heat level than the first source during operation of the internal combustion engine.

The term "means for providing a . . . coolant" may for example comprise a conduit for the working fluid and some kind of connection means for operatively connecting the conduit to the source. Further, the term "means for providing a . . . coolant" may for example comprise a valve or similar for controlling a coolant flow from the source.

Further, the term "source" should not be interpreted as limited to a component capable of providing the required cooling during operation of the internal combustion engine, but to comprise for example a part of a component or conduit, a working fluid or position of a component or conduit. Further, the first source and the further source may be formed by two separate components or working fluids or may be formed by the same component or working fluid provided that the criteria that the two sources are configured to be on different heat levels is fulfilled.

Preferably, the first source is associated to the internal combustion engine. Further preferably, the further source is associated to the internal combustion engine. The wording "associated to the internal combustion engine" should not be interpreted to be limited to that the source is an integral part of the internal combustion engine itself, but to comprise also systems and components operatively connected to the internal combustion engine or at least which functioning has an impact on the operation of the internal combustion engine or vice versa.

By the provision of a waste heat recovery device, which comprises the first means for providing a first coolant from a first source and the further means for providing a further coolant from a further source, which sources are on different heat levels, the advantage that the thermodynamic engine may be provided with different cooling capability depending on the specific conditions, such as internal combustion engine operational conditions, atmospheric conditions, cooling requirements for other systems etc. Further, the waste heat recovery device creates conditions for a cost effective and small-sized cooling arrangement.

Further, using coolant of at least two different temperatures allows for an increased cooling capacity of the vehicle.

The provision of a waste heat recovery device, which comprises the first means for providing a first coolant from a first source and the further means for providing a further coolant from a further source, which sources are on different heat levels, creates conditions for providing a relatively cold coolant and/or a relatively warm coolant and/or a mixture of cold and warm coolant to the thermodynamic engine.

This enables that during low or normal ICE operation modes, the thermodynamic engine is cooled by cold coolant and thus may be cooled to a low temperature thereby increasing the efficiency of the energy conversion. During high load ICE operation modes or if the internal combustion engine is operated at high ambient temperature, the cold ICE coolant is required for cooling the internal combustion engine. In this case, the thermodynamic engine may be cooled by the warm (ICE) coolant returning from the internal combustion engine, which may decrease the energy conversion efficiency of the heat recovery assembly, but increases the temperature of the ICE coolant at the inlet of the ICE cooling device, which in turn increases the cooling capacity of the vehicle.

In the following the term "ICE operation modes" is used as abbreviation of "internal combustion engine operation modes":

i. "High load ICE operation modes" are defined as ICE operation modes, where the driving situation requires a lot of driving force, e.g. running uphill or accelerating.

II "Normal load ICE operation modes" are defined as ICE operation modes, where the vehicle is neither substantially accelerating nor substantially decelerating, e.g. the vehicle is running at constant speed on a high way.

III "Low load ICE operation modes" are defined as ICE operation modes, where the vehicle requires little driving force, e.g. when the vehicle is running downhill or decelerates.

IV. "No load ICE operation modes" are defined as ICE operation modes, where the internal combustion engine is stopped.

Usually, the ICE cooling circuit comprises an ICE coolant cooler, preferably a radiator, for providing cold ICE coolant, an ICE coolant supply duct for supplying the cold ICE coolant from the cooler to the internal combustion engine, an ICE coolant return pipe for returning warm ICE coolant from the internal combustion engine to the cooler and a pump for transportation of the ICE coolant. Preferably, the pump is arranged at the ICE coolant supply duct.

The waste heat recovery device is preferably adapted to convert thermal energy of a waste heat source of the internal combustion engine into kinetic and/or electric energy.

According to one embodiment, the first coolant providing means is configured for providing the working fluid circulation circuit with the first coolant from a cooling arrangement of the internal combustion engine. By using the ICE coolant, an additional coolant circuit for the working fluid circulation circuit is not necessary, which in turn reduces the number of parts in the vehicle and allows for an increased and efficiency-improved cooling concept.

Preferably, the first coolant providing means is configured for being connected to a coolant conduit of the cooling arrangement of the internal combustion engine in a position downstreams the internal combustion engine and upstreams a radiator in the cooling arrangement of the internal combustion engine.

According to a further embodiment, the further coolant providing means comprises a second coolant providing means configured for providing the working fluid circulation circuit with a second coolant from a cooling arrangement of the internal combustion engine. By using the ICE coolant for both the first coolant providing means and the further coolant providing means, an additional coolant circuit for the working fluid circulation circuit is not necessary, which in turn reduces the number of parts in the vehicle and allows for an increased and efficiency-improved cooling concept.

Preferably, the second coolant providing means is configured for being connected to a coolant conduit of the cooling arrangement of the internal combustion engine in a position downstreams of a radiator in the cooling arrangement of the internal combustion engine and upstreams of the internal combustion engine.

For example, when there is a low or medium demand of power to the vehicle, the thermodynamic engine may be cooled from the radiator out utilising a low condensing temperature which gives a high Rankine efficiency. When there is a high demand of power to the vehicle and possibly also a high ambient temperature so that the cooling efficiency of the vehicle is too low for using the radiator out, then the condensing temperature is increased and the coolant is taken from the engine out.

For providing ICE coolant of at least two different temperatures, the system preferably comprises a cold ICE coolant supply branch branching off from the ICE coolant supply duct, preferably upstream of the pump, and/or a warm ICE coolant supply branch branching off from the ICE coolant return duct.

According to a further embodiment, the further coolant providing means comprises a third coolant providing means configured for providing the working fluid circulation circuit with a third coolant from a component positioned for heat exchange with ambient air, which component is separate from a cooling arrangement of the internal combustion engine. For example, the heat exchange component may be formed by a cooling device positioned adjacent the radiator in the internal combustion engine cooling circuit.

The third coolant providing means may be an alternative to the second coolant providing means or the waste heat recovery device may comprise both the second coolant providing means and the third coolant providing means.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
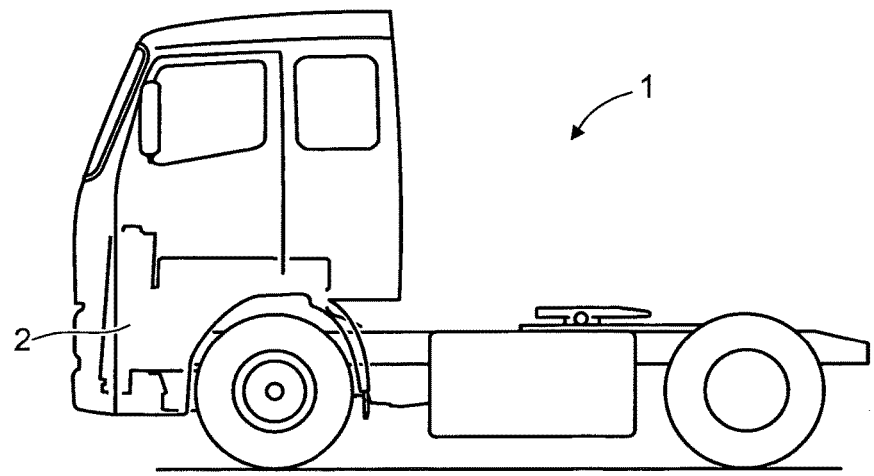
FIG. 1: shows a side view of a vehicle in the form of a truck, which comprises a an internal combustion engine for propelling the vehicle and a device for recovery of waste heat generated during operation of the internal combustion engine.

In the following same or similar functional parts are indicated with the same reference numerals.

FIG. 1 shows a side view of a vehicle in the form of a truck 1. The truck 1 is provided with a source of motive power 2 for propelling the truck via a driveline connecting the power source to the wheels. The power source 2 is constituted by an internal combustion engine in the form of a diesel engine. It will in the following for ease of presentation be referred to as an internal combustion engine 2.

Figure 2:
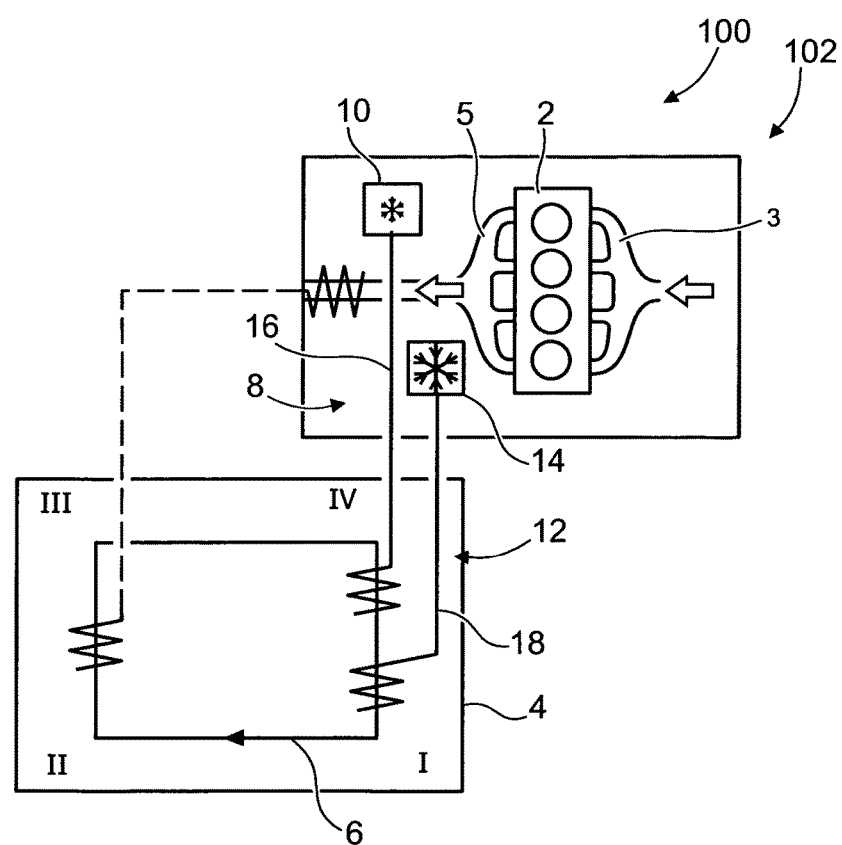
FIG. 2-6: shows a schematic drawing of the waste heat recovery system according to a first to fifth embodiment example, FIG. 7a-d schematically shows a first example of a condenser unit in the waste heat recovery device for any one of the first to fifth embodiment examples, FIG. 8 schematically shows a second example of a condenser unit in the waste heat recovery device for any one of the first to fifth embodiment examples.

FIG. 2 shows an air intake side 3 and an exhaust side 5 of the internal combustion engine 1. FIG. 2 further shows a first embodiment example of a device 100 for recovery of waste heat generated during operation of the internal combustion engine 2. The waste heat recovery device 100 is arranged for recovery of waste heat from the exhaust gases of the internal combustion engine 1. The waste heat recovery device 100 comprises a thermodynamic engine 4, which comprises a working fluid circulation circuit 6 and is configured for recovery of the waste heat via heat exchange. FIG. 2 further shows an internal combustion engine system 102 comprising the internal combustion engine 2, the first coolant source 10, the second coolant source 14 and the waste heat recovery device 4.

The thermodynamic engine 4 is configured to convert the working fluid from a liquid phase to a gaseous phase and back again in the working fluid circulation circuit. The thermodynamic engine 4 is formed by a Rankine cycle engine and has at least four stages. In a first stage I, the working fluid of the thermodynamic engine 4 is in its liquid phase and has a pressure around ambient air pressure. In a subsequent second stage II, the working fluid is still in its liquid phase but pressurized to a predetermined pressure. In a subsequent third stage III, the working fluid has been transferred into its gaseous phase and is pressurized to a predetermined pressure above ambient air pressure. In a subsequent fourth stage IV, the working fluid is still in its gaseous phase, but has a pressure around ambient air pressure. An example of such a thermodynamic engine 4 will be described below with reference to FIG. 5.

The waste heat recovery device 100 further comprises a first means 8 for providing a first coolant from a first source 10 for heat exchange with the working fluid in the working fluid circulation circuit 6. The waste heat recovery system 100 further comprises at least one further means 12 for providing a further coolant from a further source 14 for heat exchange with the working fluid in the working fluid circulation circuit 6, wherein the further source 14 is at different heat level than the first source 10 during operation of the internal combustion engine.

The first coolant providing means 8 comprises a first coolant conduit 16 connecting to the working fluid circulation circuit 6 to the first source 10. The further coolant providing means 12 comprises a further coolant conduit 18 connecting to the working fluid circulation circuit 6 to the further source 14.

Figure 3:
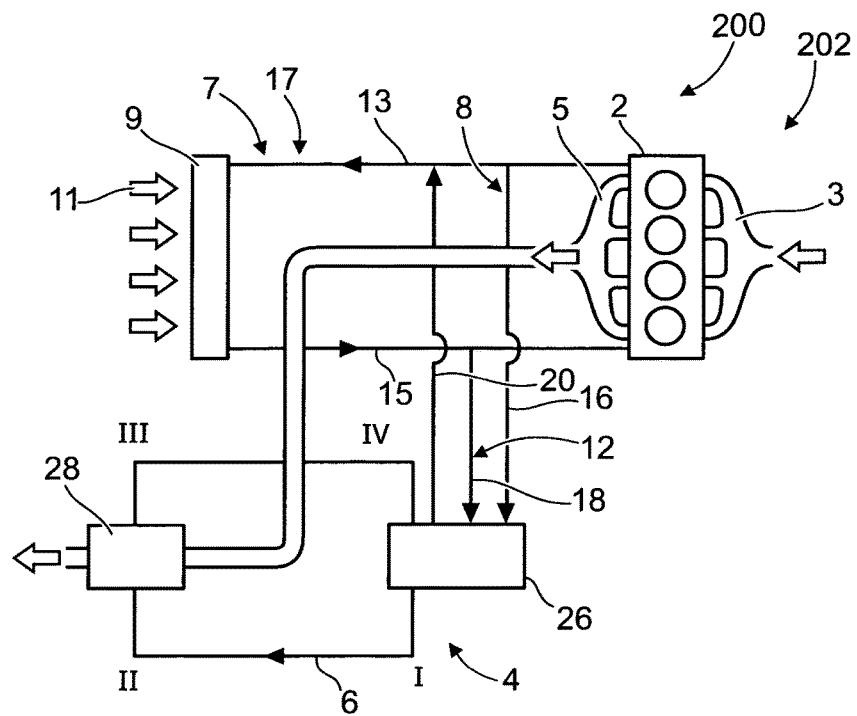

FIG. 3 shows a second embodiment example of a device 200 for recovery of waste heat generated during operation of the internal combustion engine 2. FIG. 3 further shows an internal combustion engine system 202 comprising an arrangement 7 for cooling the internal combustion engine 2. The cooling arrangement 7 comprises a coolant circuit 17, which comprises a radiator 9. The radiator 9 is arranged in the front of the vehicle 1, preferably just behind a vehicle grille in order to receive a flow of ambient air 11. The radiator 9 may be formed by a heat exchanger in a conventional way and will not be further explained here. The coolant circuit 17 comprises a first coolant conduit 13 configured to convey the coolant from the internal combustion engine 2 to the radiator 9 and a second coolant conduit 15 configured to convey the coolant from the radiator 9 to the internal combustion engine 2.

The first coolant providing means 8 is configured for providing the working fluid circulation circuit 6 with the first coolant from the cooling arrangement 7. More specifically, the first coolant providing means 8 is configured for being connected to a coolant conduit 13 of the cooling arrangement 7 of the internal combustion engine 2 in a position downstreams the internal combustion engine 2 and upstreams the radiator 9.

The further coolant providing means 12 comprises a second coolant providing means 12 configured for providing the working fluid circulation circuit with a second coolant from the cooling arrangement 7 of the internal combustion engine.

The second coolant providing means 12 is configured for being connected to a coolant conduit 15 of the cooling arrangement 7 of the internal combustion engine in a position downstreams of the radiator and upstreams of the internal combustion engine 2. The second coolant providing means 12 comprises a second coolant conduit 18 connected to the working fluid circulation circuit.

The waste heat recovery system 200 comprises a return coolant conduit 20 for returning the first coolant from the working fluid circulation circuit 6 to the internal combustion engine cooling conduit. The return coolant conduit 20 is in this embodiment configured to also convey the further coolant from the working fluid circulation circuit 6 to the internal combustion engine cooling conduit.

The working fluid circuit 6 comprises at least one condenser unit 26, which is configured to cool the working fluid during waste heat recovery operation. The condenser unit 26 is connected to the first coolant providing means 16 for receipt of the first coolant and to the second coolant providing means 18 for receipt of the further coolant. The design of and operation of the condenser unit 26 will be described in more detail below with reference to FIG. 7.

The working fluid circulation circuit 6 comprises a means 28 for recovery of waste heat generated during operation of the internal combustion engine. The waste heat recovery means 28 comprises a heat exchanger configured for heat exchange between the working fluid in the working fluid circulation circuit 6 and an exhaust gas from the internal combustion engine 2.

Figure 4:
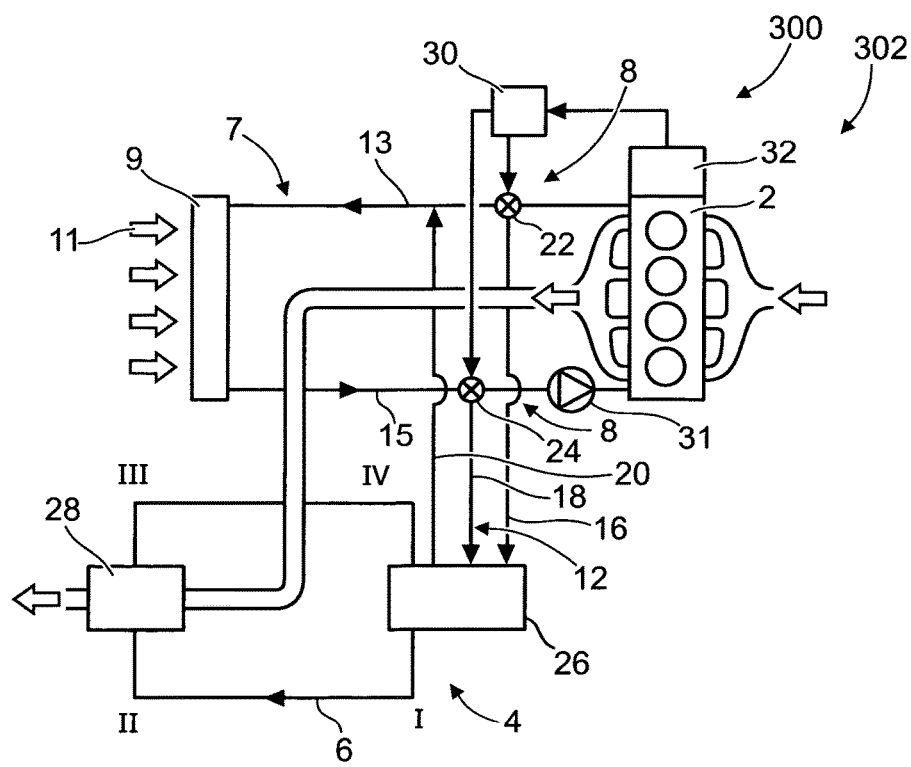

FIG. 4 shows a third embodiment example of a device 300 for recovery of waste heat generated during operation of the internal combustion engine 2. The cooling arrangement 7 comprises a pump unit 31 for pumping the coolant in the coolant circuit 17. The first coolant providing means 8 comprises a first member 22 for connecting and disconnecting, respectively the working fluid circulation circuit 6 to the first source 10. The first member 22 may be configured to control coolant flow from the first source 10. The second coolant providing means 12 comprises a second member 24 for connecting and disconnecting, respectively the working fluid circulation circuit 6 to the second source 14. The second member 24 may be configured to control coolant flow from the second source 14.

The waste heat recovery device 300 comprises a means 30 for selectively controlling delivery of the first and/or further coolant to the working fluid circulation circuit 6. The control means 30 is preferably formed by a controller. The control means 30 is configured to receive information regarding an operational state of the internal combustion engine 2 and selectively control delivery of the first and/or further coolant to the working fluid circulation circuit 6 on the basis of the operational state information. The internal combustion engine 2 is provided with a means 32 for detecting the operational state of the internal combustion engine 2. The detection means 32 may be formed by a sensor and/or form part of a controller for controlling operation of the internal combustion engine 2. The operational state detection means 32 is operatively connected to the control means 30.

Further, the control means 30 is operatively connected to the first connection member 22 and/or to the second connection member 24 to control the connection and disconnection of the working fluid circulation circuit 6 to the first source 10 and further source 14, respectively (which in this embodiment example is formed by the abovementioned parts of the internal combustion engine cooling arrangement 7).

Figure 5:
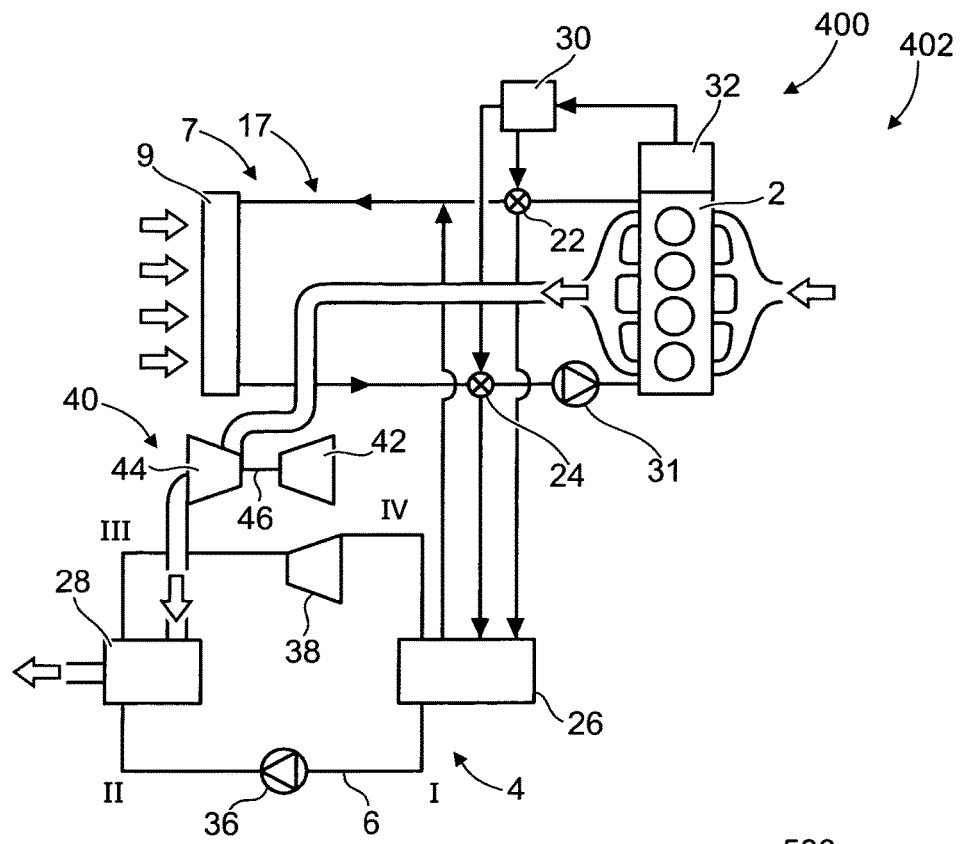

FIG. 5 shows a fourth embodiment example of a device 400 for recovery of waste heat generated during operation of the internal combustion engine 2. The working fluid circulation circuit 6 comprises a means 36 for pumping the working fluid in the working fluid circulation circuit 6 and an expansion machine 38 for extraction of energy from the working fluid.

An internal combustion engine system 402 comprises a turbocharger unit 40. The turbocharger unit 40 may be formed by a conventional turbocharger comprising a compressor wheel 42 and a turbine wheel 44, which are rotationally rigidly interconnected via a shaft 46. The turbine wheel 44 is positioned in the exhaust gas stream from the internal combustion engine 2 for extracting energy from the exhaust gases. More specifically, the turbine wheel 44 is positioned between the the internal combustion engine 2 and the heat exchanger 28 in the thermodynamic engine 4. The compressor wheel 42 is positioned in an air inlet stream (not shown) of the internal combustion engine 2.

The thermodynamic engine 4 has at least four stages. In the first stage I, upstream of the pumping means 36, the working fluid of the thermodynamic engine 4 is in its liquid phase and has a pressure around ambient air pressure. In a second stage II, downstream of the pumping means 36, the working fluid is still in its liquid phase but pressurized to a predetermined pressure by the pumping means 36. In the subsequent stage III downstream of the heat exchanger 28, the working fluid has been transferred into its gaseous phase and is pressurized to a predetermined pressure above ambient air pressure. In its fourth stage IV downstream of the expansion machine 38, the working fluid is still in its gaseous phase, but has a pressure around ambient air pressure.

Therefore, the cycle can be divided in different sides (see also table 1):

A low pressure side which is downstream of the expansion machine 38 and upstream of the pumping means 36 (stages II and III) and a high pressure side which is downstream of the pumping means 36 and upstream of the expansion machine 38 (stages I and IV); or A cold side which is downstream of the condenser unit 26 and upstream of the heat exchanger 28 (stages I and II), and a hot side which is downstream of the heat exchanger 28 and upstream of the condenser unit 26 (stages III ad IV).

TABLE 1

| Stage I | Stage II |
|---|---|
| Cold, Liquid phase Low pressure | Cold, Liquid phase High pressure |
| Stage IV | Stage III |
| Hot, Gaseous phase Low pressure | Hot, Gaseous phase High pressure |

In the following the working principle of the thermodynamic engine 4 will be explained.

In the first stage I the cool liquid working fluid streams to the pumping means 36, where the cool liquid working fluid is pressurized to a predetermined pressure above ambient air pressure. Then the pressurized liquid working fluid is transported to the heat exchanger 28 where it is heated and converted from its liquid phase to its gaseous phase. Due to the conversion into the gaseous phase the pressure may be increased once more. The pressurized gaseous phase working fluid then streams to the expansion machine 38, where the thermal energy is converted to mechanical or electrical energy. Mechanical energy can be generated by e.g. a displacement engine (not shown), such as a piston engine, where the pressurized working fluid operates a piston, or may be generated by a turbine (not shown).

Alternatively, the expansion machine 38 may operate a generator (not shown) for generating electrical energy. The pressure of the working fluid is used to displace e.g. the piston or to operate the turbine or the generator. Consequently, the pressure of the working fluid drops so that in the fourth stage IV, the working fluid has low pressure, even if it is still in its gaseous phase. The low pressure gaseous phase working fluid is subsequently transported to the condenser unit 26, where the hot working fluid is cooled below its dew point and thereby converted back into its liquid phase.

The working fluid for such a thermodynamic engine 4 can be a pure liquid e.g. water or alcohol, e.g. ethanol, or ammonia, or a mixture of at least a first component such as e.g. water with a second component, such as e.g. ammonia or ethanol, or even an water-ammonia-ethanol mixture. In case the second component influences the thermodynamic phase transition points of the working fluid, as is the case e.g. with the ammonia-water mixture and/or the ethanol-water mixture, the second component may advantageously be adapted to lower the freezing point of e.g. water so that it serves as anti-freeze protection for the working fluid.

Further, binary working fluids may be used, wherein the waste heat recovery device is configured such that a first component of the working fluid, such as water, may start to to condensate in a high temperature portion of the condenser unit and that a second component of the working fluid condensates in a low temperature portion of the condenser unit.

Figure 6:
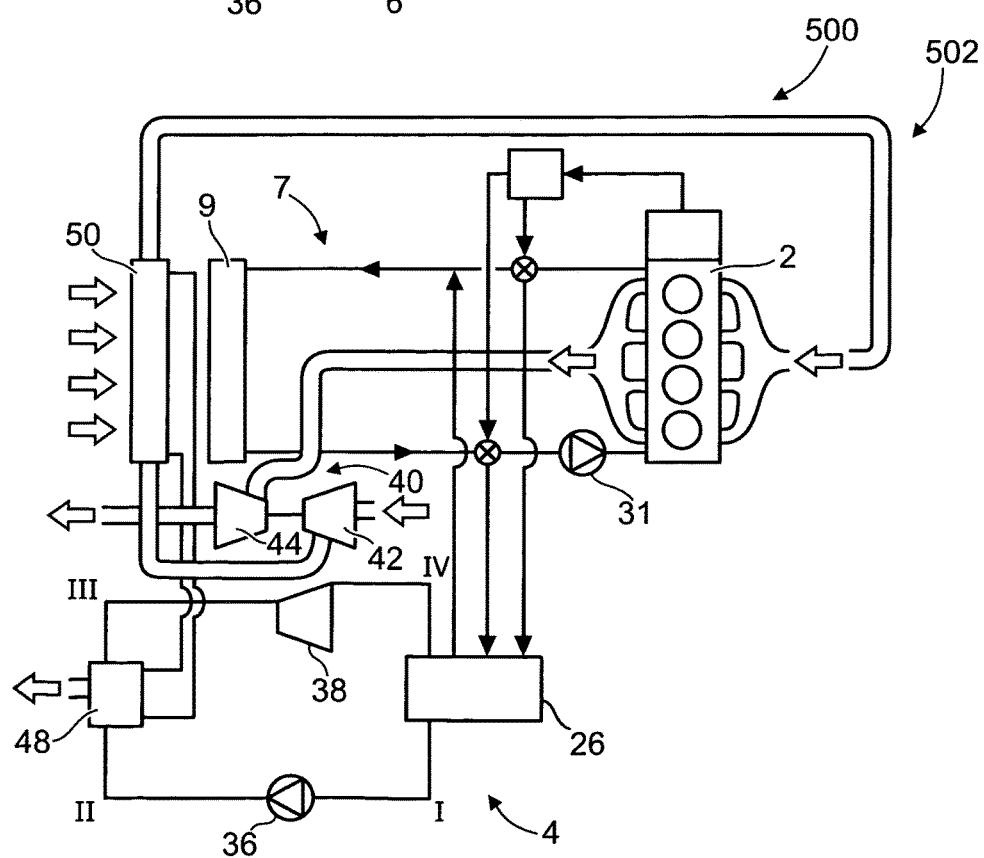

FIG. 6 shows a fifth embodiment example of a device 500 for recovery of waste heat generated during operation of the internal combustion engine 2. FIG. 6 further shows an internal combustion engine system 502 comprising the internal combustion engine 2 with the cooling system 7 and the waste heat recovery device 4. Further, internal combustion engine system 502 comprises a component 50 positioned for heat exchange with ambient air, which component is separate from the cooling arrangement 7 of the internal combustion engine. The heat exchange component 50 is positioned adjacent the radiator 9 and configured for heat exchange with the same flow of ambient air as the radiator. Thus, the heat exchange component 50 is positioned for being effected by an ambient air stream during driving the vehicle 1.

The heat exchanger 50 may be formed by a charge air cooler 50 for the internal combustion engine. The charge air cooler 50 may be provided to cool the air compressed by the turbocharger 40 before entering the internal combustion engine 2.

The waste heat recovery means comprises a heat exchanger 48 configured for heat exchange between the working fluid and charge air of the charge air cooler 50 of the internal combustion engine.

FIG. 7*a-d* schematically shows a first example of the condenser unit 26 in the waste heat recovery device for any one of the first to fifth embodiment examples. The condenser unit 26 is formed by a plate heat exchanger. The plate heat exchanger comprises a plurality of plates, wherein a subset of three plates 80,82,84 is shown in FIG. 7. The plates are arranged in parallel and stacked next to each other. The plates 80,82,84 have the same hole configuration, wherein a plurality of plates form conduits through the holes for conveying fluids in a direction perpendicular to a plane in parallel with the plates. Further, each plate has a specific sealing arrangement on at least one of its sides for conveying the fluids in a desired way. According to one example, each plate has a first sealing configuration on a first side and a second sealing configuration on a second side FIG. 7*a* shows an exploded perspective view of a part of the condenser unit 26 from a first side. FIG. 7*b* shows a side view of one of said plates from a first side. FIG. 7*c* shows an exploded perspective view of the part of the condenser unit 26 from a second side. FIG. 7*d* shows a side view of one of said plates from a second side, opposite the first side.

The first coolant is conveyed to a first hole 62, see arrow 90. The second coolant is conveyed to a second hole 64, see arrow 92 from the same side of the plate. For ease of presentation, the condenser unit 26 in FIGS. 7*a*-7*d* will in the following be presented for the embodiment of FIG. 3. The first coolant is conveyed from a position downstream the ICE and upstream the radiator 9 while the second coolant is conveyed from a position downstream the radiator 9 and upstream the ICE 2. Each plate 80 is provided with a sealing 93 on a side facing the coolant flow, which sealing surrounds only the first and second hole 62, 64 and a third hole 66 for allowing the first and second coolant to mix between the plates and wherein the coolant mixture, see arrow 94 will be returned in an opposite direction through the third hole 66.

The plates 80 have a rectangular shape and the first and second holes are provided at two adjacent corners of the plate while the third hole is provided at a midpoint between the other two corners of the plate.

The hot working fluid is conveyed to a fourth hole 68 from the same side of the plate as the first and second coolants, see arrow 96. The cooled working fluid is returned via a fifth hole 70, see arrow 98. Each plate 80 is provided with a sealing 95 on a side turned away from the coolant flow, which sealing 95 surrounds only the fourth and fifth hole 68,70 for allowing the cooled working fluid to be returned in an opposite direction through the fifth hole 70. The fourth and fifth holes 68,70 are provided in the two remaining corners, more specifically on opposite sides of the third hole 66.

Further, there is a sealing 97 surrounding only the fourth hole 68 on the side of the plate facing the coolant incoming flow. Further, there is sealing 99 surrounding only the fifth hole 70 on the side of the plate facing the coolant incoming flow. Further, likewise, there are three sealings 101, 103, 105, each surrounding only one of the first, second and third holes 62, 64, 66 on the side of the plate turned away from the coolant incoming flow.

Figure 8:
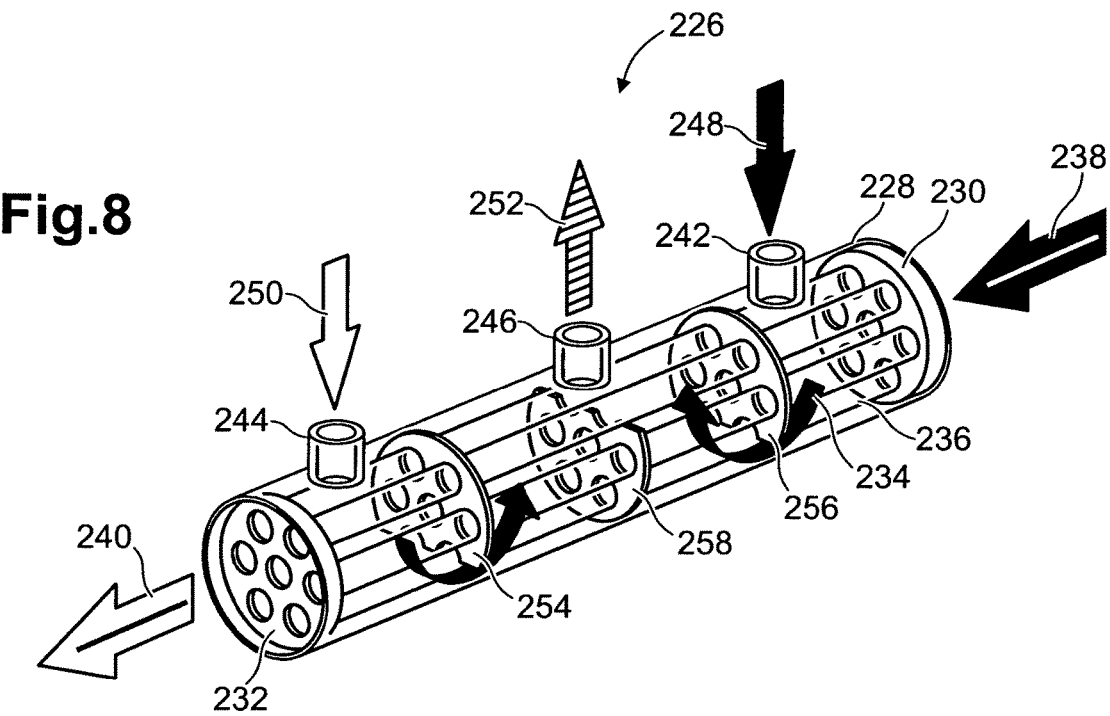

FIG. 8 schematically shows a second example of the condenser unit 226 in the waste heat recovery device for any one of the first to fifth embodiment examples. The condenser unit 226 is formed by a tubular heat exchanger. The tubular heat exchanger comprises a cylindrical casing 228 extending between two end plates 230,232 at opposite sides in an axial direction of the tubular heat exchanger.

A plurality of tubes 234,236 extend between the two end plates 230,232. The tubes 234,236 are arranged in parallel with each other and in the axial direction of the tubular heat exchanger. The hot working fluid enters the tubes 234,236 at a first end, see arrow 238, and exits the tubes at a second end, see arrow 240.

Further, the tubular heat exchanger 226 comprises two inlets 242,244 for coolant and one outlet 246 for the coolants. The inlets 242,244 and the outlet 246 are axially spaced and arranged for conveying the coolants to an interior of the tubular casing 228, see arrows 248,250 and from the interior of the tubular casing 228, see arrow 252, respectively. More specifically, the inlets 242,244 and the outlet 246 are distributed along a straight line in the axial direction of the tubular heat exchanger. The outlet 246 is positioned between the inlets 242,244 in the axial direction. The coolants will flow inbetween the tubes 234,236 and mix before exiting the tubular heat exchanger 226 via the outlet 246.

Further, the tubular heat exchanger 226 comprises a plurality of axially spaced means 254,256,258 positioned inside the casing 228 for conveying the coolants in a desired way. More specifically, coolant conveying means 254,256, 258 are formed by division walls, which divide the interior of the tubular heat exchanger 226 into different compartments, wherein the division walls are configured for communication between compartments on different sides of each division wall. More specifically, each compartment wall 254,256 located closest to the respective inlet 242,244 has an opening at a radially opposite side of the compartment wall in relation to the inlet for providing a beneficial heat exchange between the coolant and the working fluid.

Figure 9:
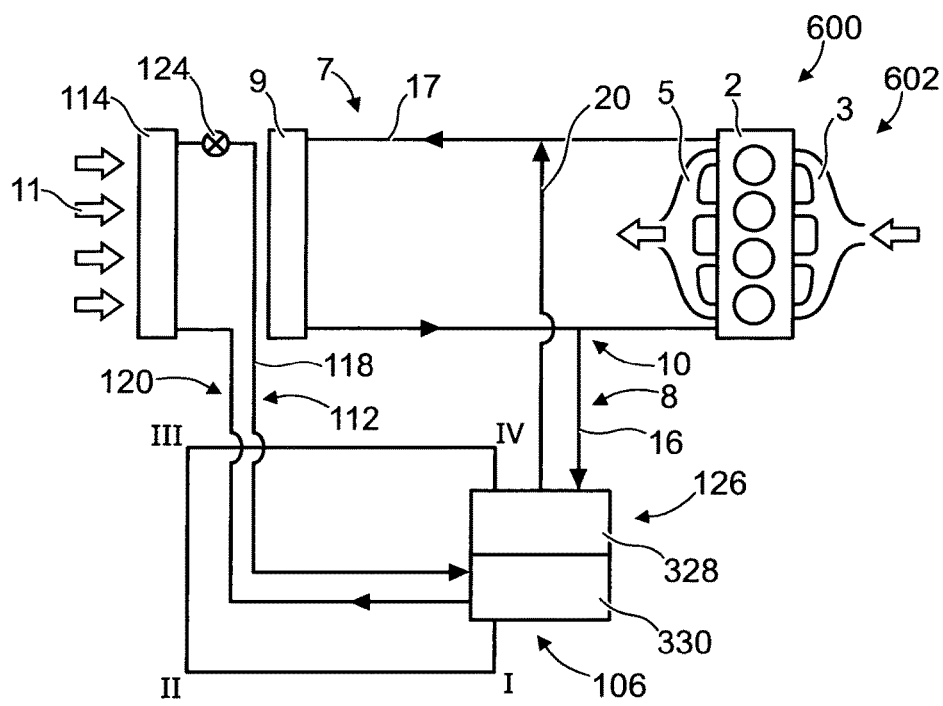
FIG. 9 shows a schematic drawing of the waste heat recovery system according to a sixth embodiment example, FIG. 10a-d schematically shows a third example of a condenser unit in the waste heat recovery device for the sixth embodiment example, and FIG. 11 schematically shows a fourth example of a condenser unit in the waste heat recovery device for the sixth embodiment example.

FIG. 9 shows a schematic drawing of the waste heat recovery device according to a sixth embodiment example. The sixth embodiment example differs from the second embodiment example shown in FIG. 3 in that the further coolant providing means comprises a third coolant providing means 112 configured for providing the working fluid circulation circuit 106 with a third coolant from a component 114 positioned for heat exchange with ambient air, which component 114 is separate from a cooling arrangement of the internal combustion engine.

The condenser unit 126 is configured for conveying the first coolant and the third coolant separate from each other. The condenser unit 126 comprises a first section 328 configured to convey the first coolant and a further section 330 configured to convey the third coolant. The further section 330 is positioned next to the first section 328 in a flow direction of the working fluid through the condenser unit.

FIG. 10*a-d* shows the condenser unit 126 in the form of a plate heat exchanger 126 in the sixth embodiment. More specifically, FIG. 10*a-d* shows an alternative design of the plate heat exchanger 126 in relation to FIG. 7*a-d* in similar views. The plate heat exchanger 126 in FIG. 10*a-d* differs from the plate heat exchanger 26 in FIG. 7*a-d* in that the hole configuration provides for keeping the two coolants separate within the plate heat exchanger 126. The plate is provided with two coolant return holes 66*a*, 66*b*, wherein a first coolant return hole 66*a* is arranged in communication only with the first hole 62 and the second coolant return hole 66*b* is arranged in communication only with the second hole 64. This is accomplished via a specific sealing configuration. More specifically, a first sealing portion 93*a* is configured to surround only the first hole 62 and one of the two coolant return holes 66*a* and a sealing portion 93*b* is configured to surround only the second hole 64 and the other one of the two coolant return holes 66*b*.

Figure 11:
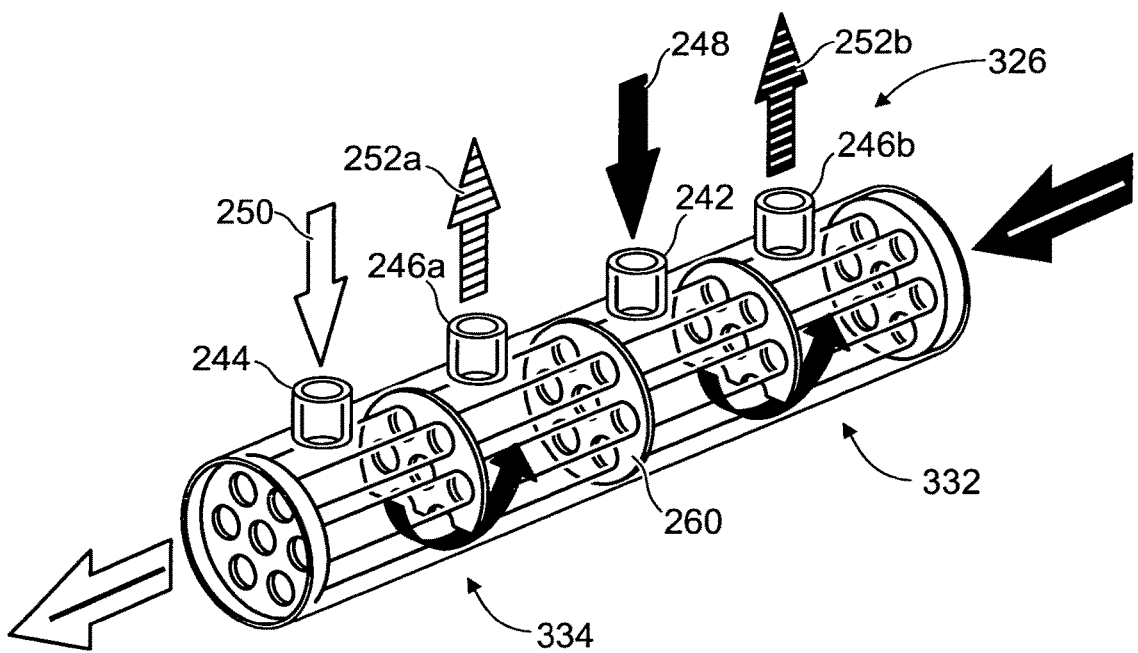

FIG. 11 shows an alternative design of a tubular heat exchanger 326 for the sixth embodiment in the form of a tubular heat exchanger 326. More specifically, FIG. 1 shows an alternative design of the tubular heat exchanger 326 in relation to FIG. 8. The tubular heat exchanger 326 in FIG. 11 differs from the plate heat exchanger 226 in FIG. 8 in that it is configured for keeping the two coolants separate within the plate heat exchanger 226. The tubular heat exchanger 326 is provided with two coolant return outlets 246a, 246b, wherein each one of the inlets 242,244 is in communication with only one of the outlets 246a, 246b. A division wall 260 provided between the two sets of inlet and outlet is configured to separate the two coolant flows.

The invention is further related to a method for recovery of waste heat generated during operation of the internal combustion engine 2. The method is described below according to a preferred embodiment example. The method comprises the steps of subjecting a working fluid in the working fluid circulation circuit 6 for waste heat generated during operation of the internal combustion engine 2, recovering energy in the heated working fluid by expansion of the working fluid, and cooling the expanded working fluid by providing the working fluid circulation circuit 6 with a first coolant from a first source 10, and cooling the expanded working fluid by providing the working fluid circulation circuit 6 with a further coolant from a further source 14, wherein the further source is at different heat level than the first source during operation of the internal combustion engine.

Preferably, the method comprises the further step of cooling the expanded working fluid by providing a condenser unit 26 in the working fluid circulation circuit 6 with the first coolant and/or the second coolant.

Preferably, the method comprises the further step of cooling the expanded working fluid by selectively providing the working fluid circulation circuit 6 with the first coolant from the first source and/or the second source.

Preferably, the method comprises the further step of receiving information regarding an operational state of the internal combustion engine 2 and selectively controlling delivery of the first and/or second coolant to the condenser unit 26 on the basis of the operational state information.

It is to be understood that the present invention is not limited to the embodiments described above and illustrated in the drawings; rather, the skilled person will recognize that many changes and modifications may be made within the scope of the appended claims.

According to one alternative, the waste heat recovery device comprises a heat exchanger configured for heat exchange between the working fluid and an oil of an oil cooler of the internal combustion engine.

As already described, FIG. 6 shows a fifth embodiment example of the waste heat recovery device, which is configured for heat exchange between the working fluid and charge air. According to an alternative, the waste heat recovery device is configured for heat exchange between the working fluid and gases from an Exhaust Gas Recirculation (EGR) system.

The invention claimed is:

1. A waste heat recovery device for recovery of waste heat generated during operation of an internal combustion engine, wherein the waste heat recovery device comprises a thermodynamic engine, which comprises a working fluid circulation circuit and is configured for recovery of the waste heat, and a first means for providing a first coolant from a first source for heat exchange with a working fluid in the working fluid circulation circuit, at least one further means for providing a further coolant from a further source for heat exchange with the working fluid in the working fluid circulation circuit, wherein the further source is at different heat level than the first source during operation of the internal combustion engine, the first means for the first coolant being configured for providing the working fluid circulation circuit with the first coolant from a cooling arrangement of the internal combustion engine, and being connected to a coolant conduit of the cooling arrangement of the internal combustion engine in a position downstream the internal combustion engine and upstream a radiator in the cooling arrangement of the internal combustion engine, and one of the at least one of the further means for providing the further coolant is also connected to the coolant conduit of the cooling arrangement of the internal combustion engine.

2. The waste heat recovery device according to claim 1, wherein the first means for providing the first coolant comprises a first coolant conduit connected to the working fluid circulation circuit.

3. The waste heat recovery device according to claim 2, wherein the waste heat recovery device comprises a return coolant conduit for returning the first coolant from the working fluid circulation circuit to the internal combustion engine cooling arrangement.

4. The waste heat recovery device according to claim 1, wherein the first means for providing the first coolant comprises a first member for connecting and disconnecting, respectively the working fluid circulation circuit to the first source.

5. The waste heat recovery device according to claim 1, wherein the at least one further means for providing the further coolant comprises a second means for providing the further coolant configured for providing the working fluid circulation circuit with a second coolant from the cooling arrangement of the internal combustion engine.

6. The waste heat recovery device according to claim 5, wherein the second means for providing the further coolant is configured for being connected to the coolant conduit of the cooling arrangement of the internal combustion engine in a position downstream of the radiator in the cooling arrangement of the internal combustion engine and upstream of the internal combustion engine.

7. The waste heat recovery device according to claim 5, wherein another of the at least one further means for providing the further coolant comprises a third means for providing the further coolant configured for providing the working fluid circulation circuit with a third coolant from a component positioned for heat exchange with ambient air, which component is separate from the cooling arrangement of the internal combustion engine.

8. The waste heat recovery device according to claim 1, wherein the at least one further means for providing the further coolant comprises a further coolant conduit connected to the working fluid circulation circuit.

9. The waste heat recovery device according to claim 1, wherein the at least one further means for providing the further coolant comprises a further member for connecting and disconnecting, respectively the working fluid circulation circuit to the further source.

10. The waste heat recovery device according to claim 1, wherein the working fluid circuit comprises at least one condenser unit, which is configured to cool the working fluid during waste heat recovery operation, and the condenser unit is connected to the first means for providing the first coolant for receipt of the first coolant and to the at least one further means for providing the further coolant for receipt of the further coolant.

11. The waste heat recovery device according to claim 10, wherein the condenser unit is configured for conveying the first coolant and the further coolant separate from the working fluid and such that beat exchange is accomplished between the first coolant and the further coolant and the working fluid.

12. The waste heat recovery device according to claim 11, wherein the condenser unit is configured for mixing the first coolant and the further coolant.

13. The waste heat recovery device according to claim 10, wherein the condenser unit is configured for conveying the first coolant and the further coolant separate from each other.

14. The waste heat recovery device according to claim 13, wherein the condenser unit comprises a first section configured to convey the first coolant and a further section configured to convey the further coolant and that the further section is positioned next to the first section in a flow direction of the working fluid through the condenser unit.

15. The waste heat recovery device according to claim 1, wherein the waste heat recovery device comprises means for selectively controlling delivery of the first and/or further coolant to the working fluid circulation circuit.

16. The waste heat recovery device according to claim 15, wherein control means is configured to receive information regarding an operational state of the internal combustion engine and selectively control delivery of the first and/or further coolant to the working fluid circulation circuit on the basis of the operational state information.

17. The waste heat recovery device according to claim 3, wherein the waste heat recovery device comprises means for selectively controlling delivery of the first and/or further coolant to the working fluid circulation circuit, and control means is operatively connected to a first connection member and/or a further connection member to control the connection and disconnection of the working fluid circulation circuit to the first source and further source, respectively.

18. The waste heat recovery device according to claim 1, wherein the working fluid circulation circuit comprises a waste heat recovery means for recovery of heat generated during operation of the internal combustion engine.

19. The waste heat recovery device according to claim 18, wherein the waste heat recovery means comprises a heat exchanger configured for heat exchange between the working fluid and an exhaust gas from the internal combustion engine.

20. The waste heat recovery device according to claim 18, wherein the waste heat recovery means comprises a heat exchanger configured for heat exchange between the working fluid and charge air of a charge air cooler of the internal combustion engine.

21. The waste heat recovery device according to claim 1, wherein the working fluid circulation circuit comprises a means for pumping the working fluid in the working fluid circulation circuit.

22. The waste heat recovery device according to claim 1, wherein the working fluid circulation circuit comprises an expansion machine for extraction of energy from the working fluid.

23. The waste heat recovery device according to claim 1, wherein the thermodynamic engine is configured to convert the working fluid from a liquid phase to a gaseous phase and back again in the working fluid circulation circuit.

24. An internal combustion engine system comprising
an internal combustion engine, and
a waste heat recovery device for recovery of waste heat generated during operation of the internal combustion engine, wherein the waste heat recovery device comprises
a thermodynamic engine, which comprises a working fluid circulation circuit and is configured for recovery of the waste heat, and
a first means for providing a first coolant from a first source for heat exchange with a working fluid in the working fluid circulation circuit,
at least one further means for providing a further coolant from a further source for heat exchange with the working fluid in the working fluid circulation circuit,
wherein
the further source is at different heat level than the first source during operation of the internal combustion engine,
the first means for providing the first coolant being configured for
providing the working fluid circulation circuit with the first coolant from a cooling arrangement of the internal combustion engine, and
being connected to a coolant conduit of the cooling arrangement of the internal combustion engine in a position downstream the internal combustion engine and upstream a radiator in the cooling arrangement of the internal combustion engine, and
one of the at least one of the further means for providing the further coolant is also connected to the coolant conduit of the cooling arrangement of the internal combustion engine.

25. The internal combustion engine system according to claim 24, wherein the cooling arrangement comprises a coolant circuit, which comprises the radiator and the coolant conduit.

26. The internal combustion engine system according to claim 25, wherein the coolant circuit comprises a first coolant conduit configured to convey the first coolant from the internal combustion engine to the radiator and a second coolant conduit configured to convey the coolant from the radiator to the internal combustion engine.

27. The internal combustion engine system according to claim 24, wherein the internal combustion engine system comprises a component positioned for heat exchange with ambient air, which component is separate from the cooling arrangement of the internal combustion engine.

28. The internal combustion engine system according to claim 25, wherein the internal combustion engine system comprises a component positioned for heat exchange with ambient air, which component is separate from the cooling arrangement of the internal combustion engine, and the component is positioned adjacent the radiator and configured for heat exchange with the same flow of ambient air as the radiator.

29. A vehicle comprising the internal combustion engine system according to claim 24.

30. A waste heat recovery device for recovery of waste heat generated during operation of an internal combustion engine, wherein the waste heat recovery device comprises a thermodynamic engine, which comprises a working fluid circulation circuit and is configured for recovery of the waste heat, and a first means for providing a first coolant from a first source for heat exchange with a working fluid in the working fluid circulation circuit, at least one further means for providing a further coolant from a further source for heat exchange with the working fluid in the working fluid circulation circuit, wherein the further source is at different heat level than the first source during operation of the internal combustion engine, and the first means for providing the first coolant being configured for
 providing the working fluid circulation circuit with the first coolant from a cooling arrangement of the internal combustion engine,
 being connected to a coolant conduit of the cooling arrangement of the internal combustion engine in a position downstream the internal combustion engine and upstream a radiator in the cooling arrangement of the internal combustion engine, the at least one further means for providing the further coolant comprises a second means for providing the further coolant configured for providing the working fluid circulation circuit with a second coolant from the cooling arrangement of the internal combustion engine, and the second means for providing the further coolant is configured for being connected to the coolant conduit of the cooling arrangement of the internal combustion engine in a position downstream of the radiator in the cooling arrangement of the internal combustion engine and upstream of the internal combustion engine.

* * * * *